F. BURGESS.
PINION WIRE AND SPUR GEAR CUTTING MACHINE.
APPLICATION FILED APR. 9, 1915.

1,267,970.

Patented May 28, 1918.
7 SHEETS—SHEET 1.

WITNESSES
Charles A. Kendall
Louise A. Jordan

INVENTOR
Frank Burgess,
by Clyde L. Rogers
his Attorney.

F. BURGESS.
PINION WIRE AND SPUR GEAR CUTTING MACHINE.
APPLICATION FILED APR. 9, 1915.

1,267,970.

Patented May 28, 1918.
7 SHEETS—SHEET 3.

WITNESSES
Charles A. Kendall
Louise A. Jordan

INVENTOR
Frank Burgess,
by Clyde L. Rogers
his Attorney.

F. BURGESS.
PINION WIRE AND SPUR GEAR CUTTING MACHINE.
APPLICATION FILED APR. 9, 1915.

1,267,970.

Patented May 28, 1918.
7 SHEETS—SHEET 4.

WITNESSES
Charles A. Kendall
Louise A. Jordan

INVENTOR
Frank Burgess,
by Clyde L. Rogers
his Attorney

F. BURGESS.
PINION WIRE AND SPUR GEAR CUTTING MACHINE.
APPLICATION FILED APR. 9, 1915.
1,267,970.
Patented May 28, 1918.
7 SHEETS—SHEET 5.
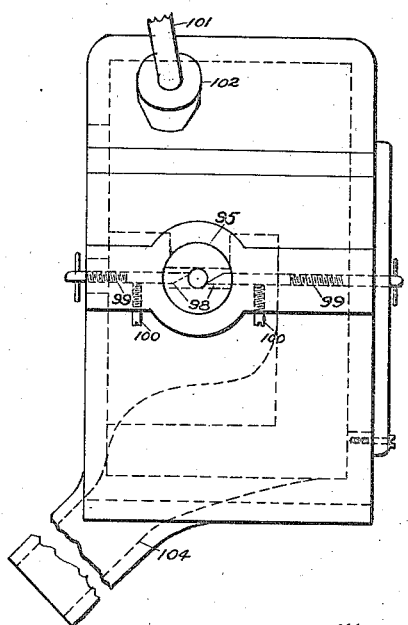
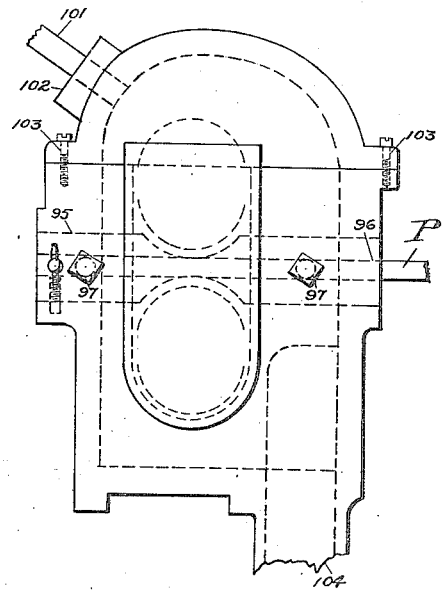
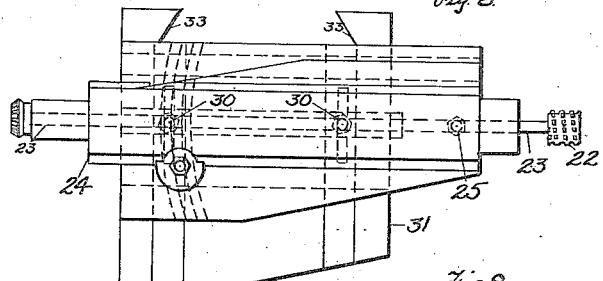
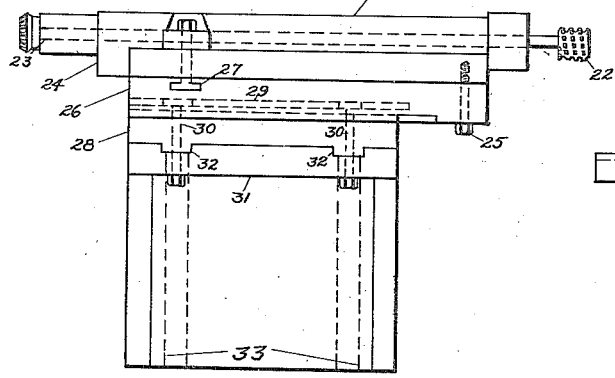
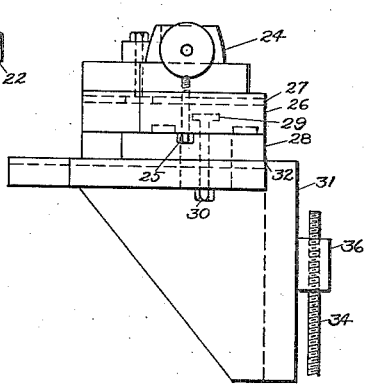
WITNESSES
Charles A. Kendall
Louise A. Jordan
INVENTOR
Frank Burgess,
by Clyde L. Rogers
his Attorney.

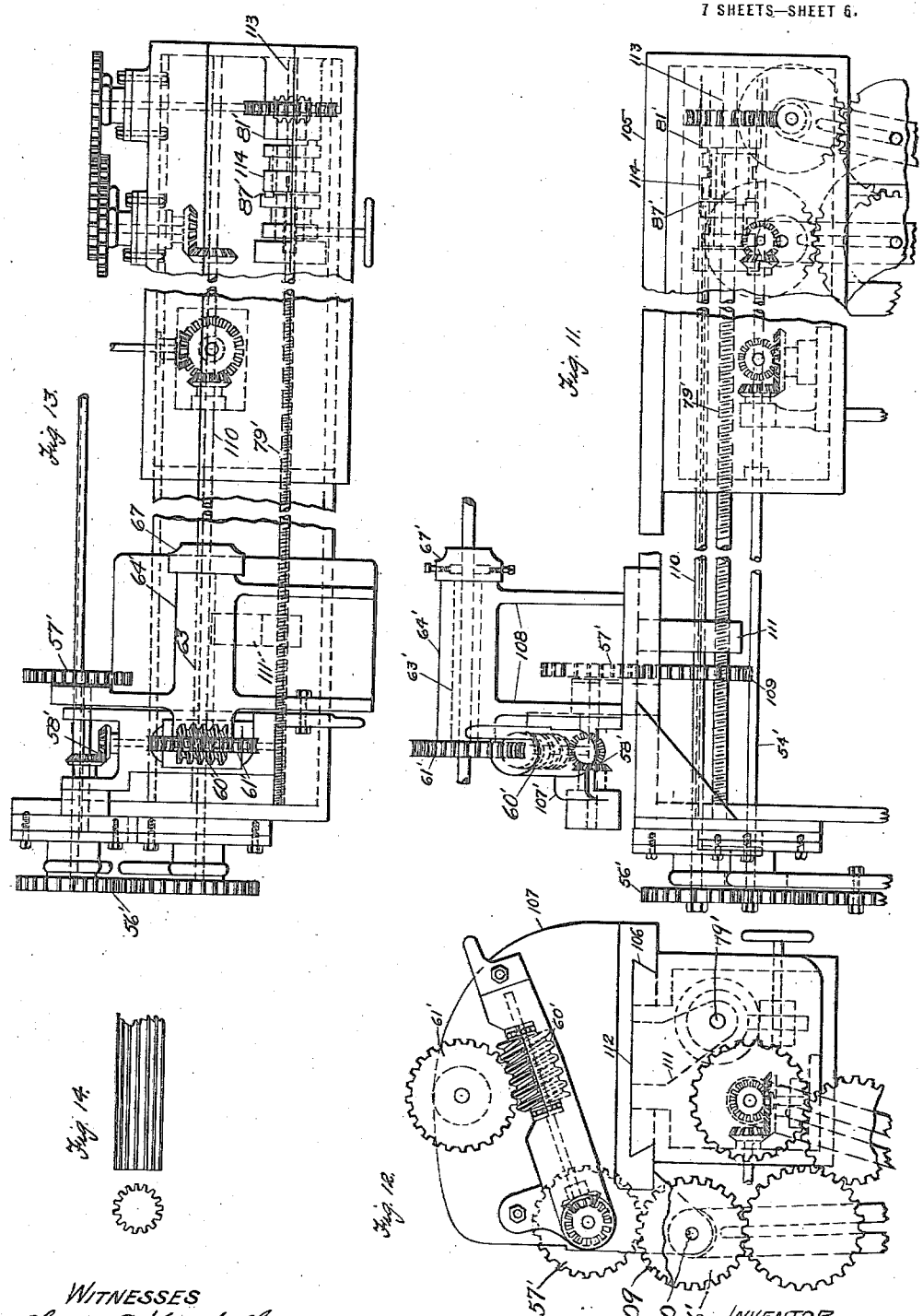

F. BURGESS.
PINION WIRE AND SPUR GEAR CUTTING MACHINE.
APPLICATION FILED APR. 9, 1915.
1,267,970.
Patented May 28, 1918.
7 SHEETS—SHEET 7.
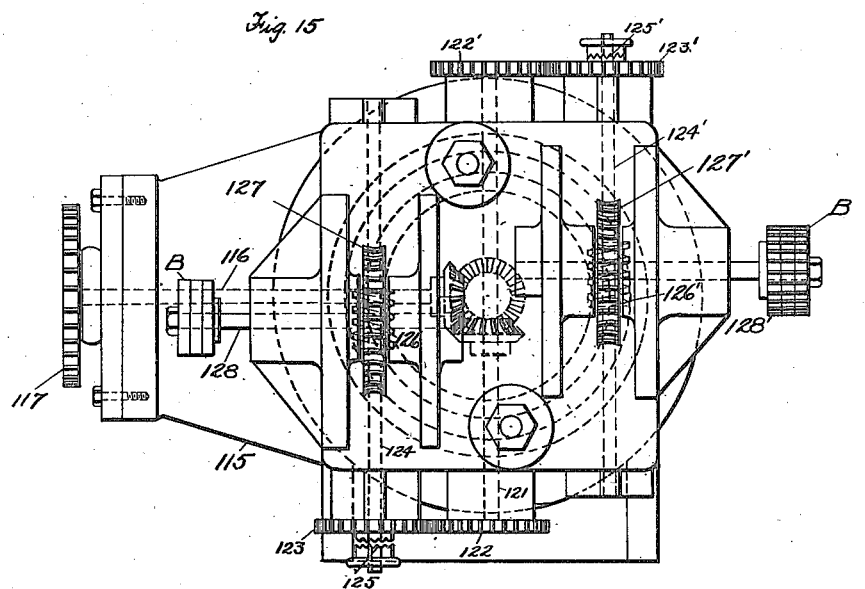
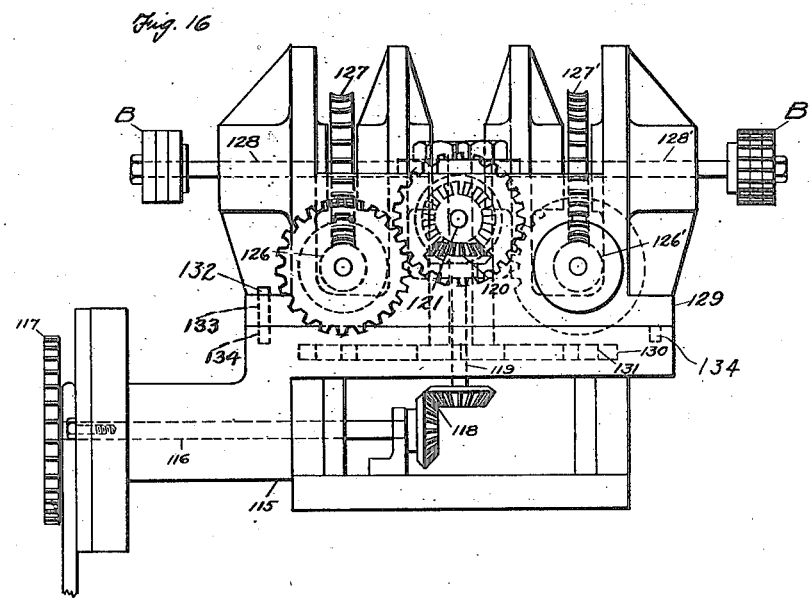

UNITED STATES PATENT OFFICE.

FRANK BURGESS, OF WOLLASTON, MASSACHUSETTS.

PINION-WIRE AND SPUR-GEAR-CUTTING MACHINE.

1,267,970.

Specification of Letters Patent.

Patented May 28, 1918.

Application filed April 9, 1915. Serial No. 20,174.

*To all whom it may concern:*

Be it known that I, FRANK BURGESS, a citizen of the United States, and resident of Wollaston, county of Norfolk, Commonwealth of Massachusetts, have invented an Improvement in Pinion-Wire and Spur-Gear Cutting Machines, of which the following description, in connection with the accompanying drawings, is a specification, like characters on the drawings representing like parts in each of the several views.

This invention relates to a type of gear cutting machine that while having other and more general fields of usefulness is specially designed as to certain features thereof for the cutting of pinion wire accurately and rapidly, with the particular aim of largely increasing productive capacity over machines hitherto designed for this purpose, such as those using an ordinary rotary cutter. The present machine as will hereinafter more fully appear is adapted for cutting at a single continuous operation pinion wire of any commercial length that may be required. Pinion wire may be described as a spur or helical gear with an elongated face and with no hole or bore therethrough, the teeth being produced throughout the length of rod or wire stock as long as may be required. The special object in making gears in this manner is that it cheapens production, since after the pinion wire is produced in this way, it can be put into an automatic screw machine, and gears of small length of face can be cut up more cheaply with the exact shape, length of face, hub, and hole required, than would be the case if the blanks were first formed and the teeth cut separately. Further the time required for taking a blank off the arbor in the ordinary process of gear cutting, and putting a new blank on, adds considerably to the cost. A prime object of the invention is to obtain a rapid production of small gears and pinions while preserving great accuracy and smoothness of cut, by forming the gear teeth correctly on a continuous rod or wire before the same is cut into individual gears or pinions. To further enhance the capability of rapid operation I preferably employ duplicate cutters, one of which may be set so as to serve as a roughing out cutter, and the other which is preferably driven direct from the prime driver of the machine producing the finished cut with smoothness and accuracy. While more especially designed for cutting pinion wire for spur pinions or gears, the machine is also adapted for cutting pinion wire for pinions with helical teeth. A further object of the invention is to provide improved means for controlling the circulation of oil or other lubricant so that a large volume of lubricant is caused to circulate past the cutting point and is kept confined so that it cannot scatter or spatter over the machine but must return through a definite outlet, this being effected by housing the cutters and the pinion wire blank in a special boxing. A further object is to provide improved means for dressing down the wire stock to a uniform size, removing small irregularities therein, just before the tooth forming cutter or cutters engage the same. A still further object is to provide means to promote the rapid cutting of spur gears, especially of the smaller sizes. The foregoing and other objects and features of the invention will be better understood from the following description taken in connection with the accompanying drawings and will be thereafter pointed out in the appended claims.

Referring to the drawings:

Fig. 6 is an end view of the cutter box;

Fig. 7 is a side elevation thereof;

Fig. 8 is a detail plan showing the mounting permitting angular adjustment of the lower cutter;

Fig. 9 is a side elevation of the parts shown in Fig. 8;

Fig. 10 is an end view of the same parts;

Fig. 11 is a partial front view showing a modification of the means for supporting, feeding and moving the work;

Fig. 12 is an end view of the mechanism shown in Fig. 11;

Fig. 13 is a plan thereof;

Fig. 14 is a perspective and an end view showing a section of pinion wire adapted to be produced by the present machine;

Fig. 15 is a plan view showing a modification consisting of a work holding turret head; and Fig. 16 is a front view thereof.

Figure 1:
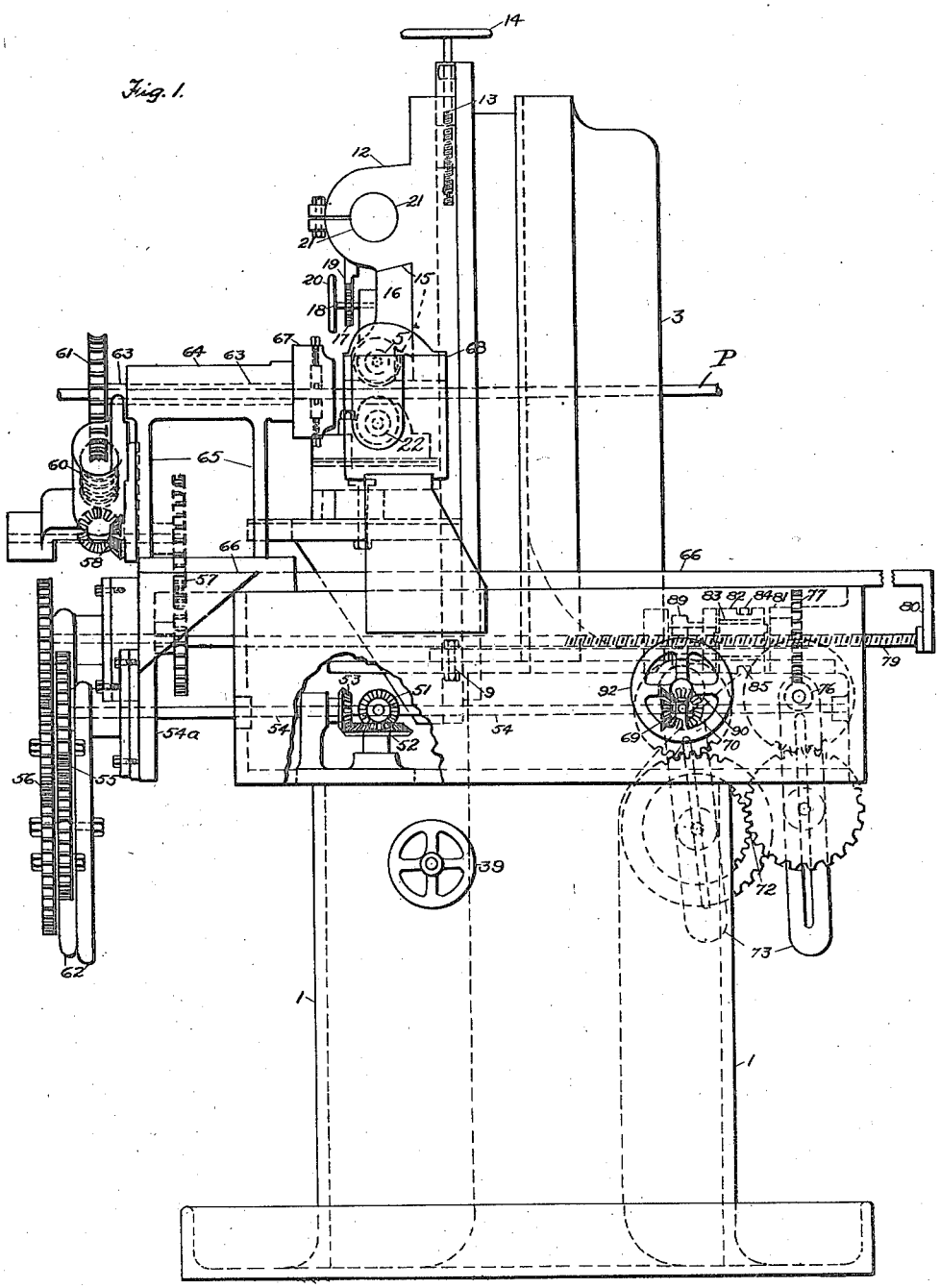
Figure 1 is a front view of a machine constructed in accordance with my invention.
Figure 2:
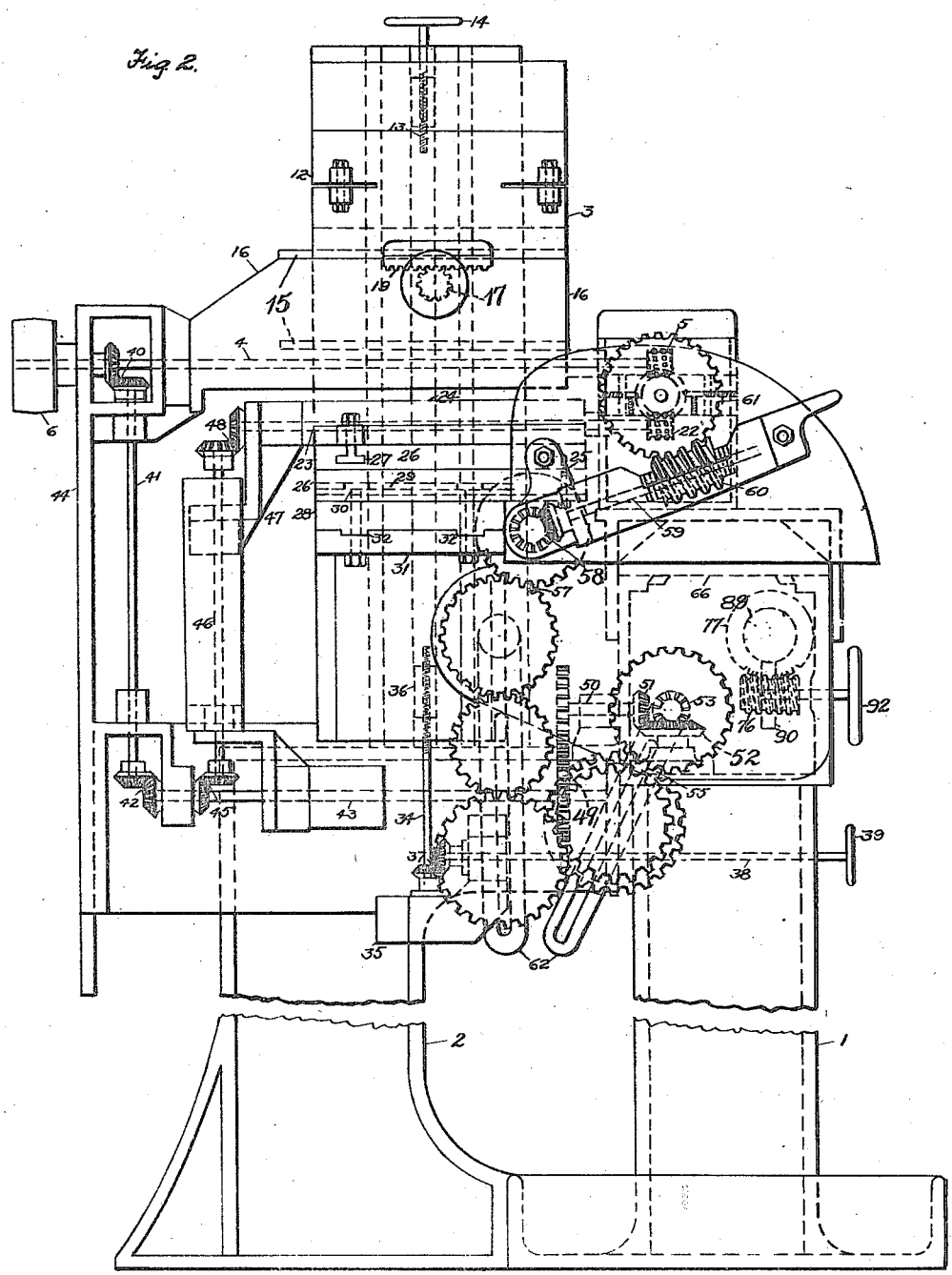
Fig. 2 is a side or end elevation thereof looking from the left in Fig. 1, parts being broken away to better show certain interior features.
Figure 3:
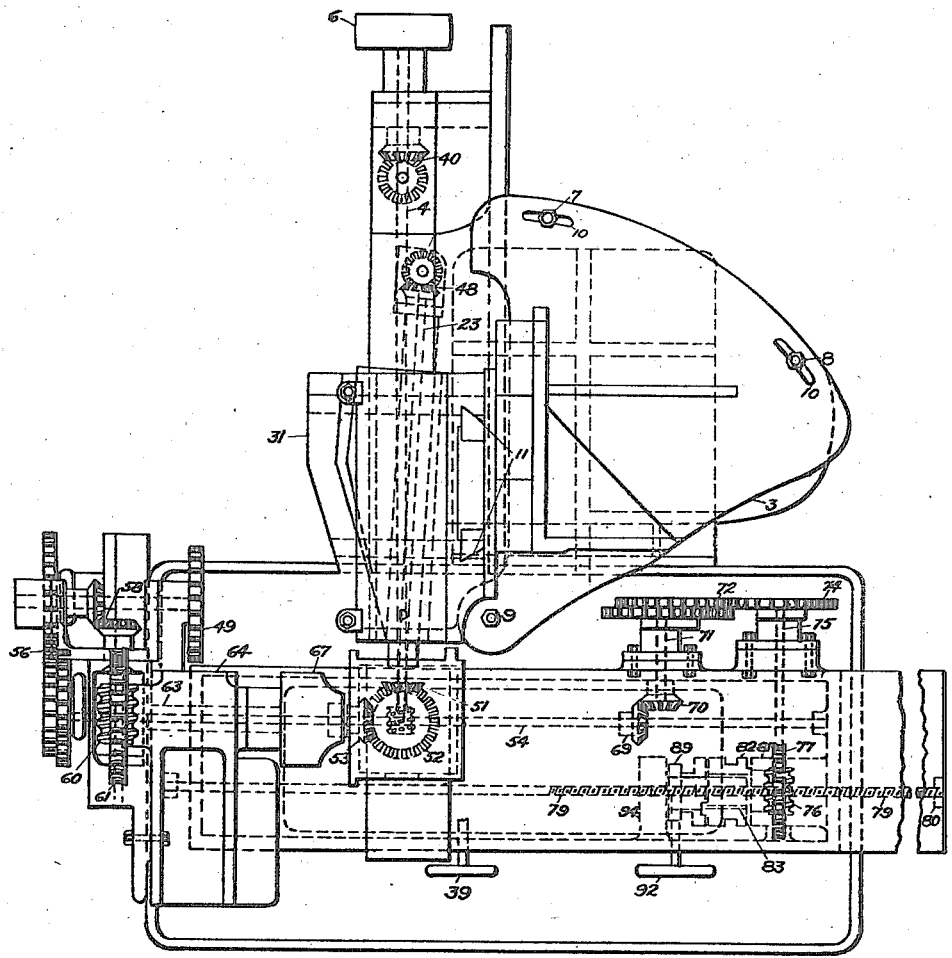
Fig. 3 is a plan view of the machine, parts also being broken away.

The supporting base and frame work of the machine comprises an upright pedestal 1 for supporting the work table or platen and another upright column or pedestal 2 on which the cutter mechanism with the adjusting means therefor, and the principal driving and operating connections are mounted. At the top of the column 2 is fitted for limited swinging adjustment in a horizontal plane, a frame or bearing block 3 which affords bearing and support for the prime drive shaft 4 of the machine which is horizontally journaled therein, having fixed thereto at an inner end a cutter shown as a hob 5 and having at its other end a driving pulley 6. The frame 3 is fitted for limited angular adjustment on the top of the column 2 for the purpose of setting the hob 5 at varying angles to the line of feed as may be required. When so adjusted, the frame is securely clamped to the column by bolts 7, 8, 9, the bolts 7, 8 passing through elongated slots 10 in the frame which permit the requisite range of swinging adjustment, while the bolt 9 serves as an axis for such adjustment. The frame 3 has an upright extension equipped on its face with vertical ways 11 to which is fitted a block 12 constituting a cutter support and adjustable vertically along the ways 11 by an adjusting screw 13 operable by a hand wheel 14. The block 12 is formed with a horizontally extending undercut slide way 15, adapted to receive a cutter holding slide block or support 16. The cutter block 16 is adjustable endwise by having a pinion 17 which is fixed to a shaft 18 journaled in said block, engaged with a rack 19 carried by the block 12, a suitable hand wheel 20 being shown for operating said pinion. The block 12 may also be equipped with a socket 21 to receive an outboard support for the cutter if required. The driving and cutter shaft 4 is journaled in the slide block 16 so that it and the cutter carried thereby are adjustable angularly by the adjustment of the frame 3, vertically by the adjustment of the block 12, and endwise by the adjustment of the cutter slide block 16. It is thus to be observed that the hob 5 while capable of all requisite operative adjustments, has a rigid reliable support and backing in all positions, and that since it is mounted directly on the prime drive shaft 4, driving impulse will always be imparted thereto and throughout its range of adjustments, so that the chattering or back lash incident to the use of intermediate gears is wholly avoided. When the machine is used with a single cutter, a cutter such as the hob 5 is employed mounted as described; when however, it is desired to increase the productive capacity of the machine by employing a second cutter, the hob 5 on account of its direct drive and rigid mounting is preferably used as a finishing cutter acting on the work from above while another roughing out cutter is mounted opposite thereto, underneath the work. Such an underneath cutter is shown as a hob 22, fixed at the inner end of a shaft 23, journaled in a bearing block 24 fitted for limited swinging adjustment about the center 25, and clamped to a platen or horizontal slide block 26 with a capability of limited angular adjustment by T bolts engaging the arcuate undercut slots 27 in said platen. The platen or slide block 26 is in turn mounted for endwise adjustment of the cutter, on an intermediate block 28 by having undercut ways 29 thereof engaged by the heads of bolts 30 which pass through the block 28. The block 28 is in turn mounted for limited sliding movement on a knee 31 in a direction to move the hob 22 transversely to position it properly along the line of feed relative to the finishing hob 5; the top of the knee 31, and the block 28, having interfitting portions 32 to hold the same relatively guided. The knee 31 is in turn equipped with undercut portions 33 which engage vertical ways of the column 2 and an adjusting screw 34 journaled and held from endwise movement in the column 2 as seen at 35, engages a nut 36 to raise and lower said knee. Suitable means may be provided for operating the screw 34 from the front of the machine, this being shown as bevel gearing 37 leading to a transverse shaft 38, extending out to the front of the machine where it is equipped with a hand wheel 39. Thus the hob 22 may be properly adjusted relative to the hob 5, its angular set of course being in the opposite direction to that of the hob 5, and both said hobs being capable of being set at a suitable angle at either side of the line of feed as may be required. The lower cutter is preferably adjusted by the described means so as to be slightly in advance of the upper cutter, in order that the roughing out tool may have a chance to enter the work a trifle ahead of the finishing cutter 5, or for any other reason found necessary, such as a difference in the diameter of the cutters employed. The lateral adjustment of the lower cutter permits its teeth to be matched with those of the finishing cutter, or set central. Driving impulse for operating the cutter 22 and also rotating and feeding it in timed relation to the movements of the cutters, is transmitted from the prime drive shaft 4 through bevel gears 40, a shaft 41 and bevel gearing 42 to a shaft 43 horizontally journaled in the fixed frame work of the machine. The bevel gears 40 and the shaft 41 are mounted and journaled in a bracket frame work 44 which is mounted to swing and move with the frame 3 in its angular adjustments, which it will be understood, are through only a very limited range, the connection of said frame with the shaft 4 and its mounting, and also with the shaft 43 being loose enough to permit such movement, the shaft 41 sliding slightly through one of the bevel gears (as shown the upper one) connected thereto, in this operation by reason of the slightly varying relation of the framework 44 to the vertical as its upper end is swung with the frame 3. For driving the cutter 22, power is transmitted from the shaft 43 through the bevel gearing 45 to an upright shaft 46 journaled in a bracket frame 47 and thence through bevel gearing 48 to the shaft 23 of the cutter 22. The bracket frame 47 is loosely fitted to the block 24, and to the framework, at its lower end, to permit the adjusting movements of the block 24 and shaft 23 described, without disturbing the driving train. To transmit power for rotating the work, the shaft 43 through spur gearing 49, and a short shaft 50, journaled in the frame work with a pinion 51 fixed thereon, drives a vertically journaled bevel gear 52 which in turn drives a bevel pinion 53, which is horizontally journaled. The pinion 53 has fitted for sliding therethrough and to be driven thereby as by a slidable key connection, a shaft 54, which extends across the front of the machine, i. e., lengthwise of the platen being journaled in the frame work and in a depending extension 54ª of the platen thereunder. The shaft 54 at one end, through change gearing 55, 56, 57, and bevel gears 58, operates a shaft 59 on which is fixed a worm 60 meshing with a worm wheel 61 mounted concentric and rigid with the chuck which holds the work, i. e., the pinion wire. Certain of the change gears 55, 56, are mounted on swinging slotted arms 62 so as to be capable of relative shifting and replacements by diverse sizes to impart the requisite drive ratio to the work rotating chuck, it being understood that the slotted swinging arms 62 which furnish a mounting for the change gears are suitably fixed to the depending end 54ª of the work table or platen. The worm wheel 61 is fixed at the end of a chuck sleeve 63 which is suitably journaled in an enlarged bearing 64 carried by spaced apart uprights 65 upstanding from the platen 66 at one end thereof. The chuck sleeve 63 has formed at the inner end thereof the chuck proper 67 equipped with suitable jaws for clamping and holding securely the wire or rod stock that is to form the pinion wire. The chuck sleeve 63 and the worm gear 61 have a guiding passage therethrough for the pinion wire stock, and the stock extending therethrough and projecting from the chuck 67 passes into a cutter box indicated generally at 68, where it is formed into pinion wire, the construction of said box and the mounting in which the tooth forming operation is carried out as the stock is moved through said box and rotated, being further described presently.

Figures 4, 5:
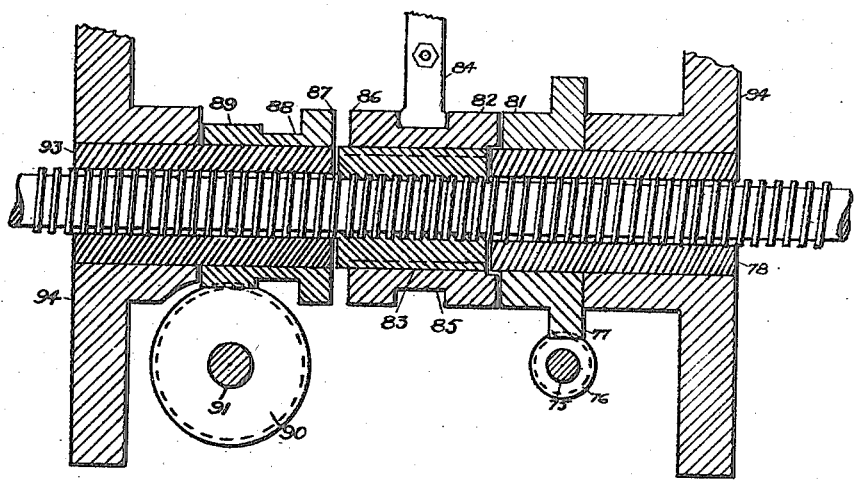
Fig. 4 is a sectional detail showing the clutch mechanism for selectively engaging either power operating means or hand operating means with the feed screw of the platen.
Fig. 5 is a diagrammatic view showing the driving and operating connections of the machine complete.

To provide means for moving the work table or platen 66 for feeding the wire stock through the cutter box, the shaft 54 is extended toward the other end of the platen, i. e., to the right as seen in Fig. 1, where it has slidable thereon a bevel pinion 69 which meshes with a pinion 70 on a shaft 71 which is horizontally journaled in the frame work, and extends back of the platen where its inner end has driving engagement with a change gear train 72, certain of the change gears of which are mounted on adjustable slotted arms 73, and the driven one 74 of which is fixed on a shaft 75 horizontally journaled in the frame work and having fixed thereon a worm 76 which meshes with a worm wheel 77. The worm wheel 77 is rotatable on a sleeve 78 which is loosely mounted on the feed screw 79, this feed screw being fixed at one end to the depending extension 54ª, and at its other end to a similar smaller extension 80 at the other end of the platen. The gear 77 has a hub equipped with a clutch face 81 engageable with a clutch formation on one end of a clutch sleeve 82, slidably splined to a nut 83 which operatively engages the feed screw 79. A suitable shipper lever 84 engages a peripheral annular groove 85 of the sleeve 82 to shift the same. The clutch sleeve 82 has at its other end a clutch face 86 adapted to engage a coöperative clutch face 87 on a hub 88, that has formed thereon a spiral wheel 89, engageable by a spiral 90 on a hand operated shaft 91 that is horizontally journaled in the frame and extends out to the front of the machine, where it is equipped with a hand wheel 92. Thus upon moving the clutch sleeve 82 into operating engagement with the clutch face 81, i. e., to the right as seen in Figs. 1 and 4, the feed nut 83 will be rotated to move the platen, and hence feed the stock P past the cutters with a power feed for the operative movement, while a hand operated return may be effected by moving the sleeve 82 out of engagement with the clutch face 81, and into engagement with the clutch face 87 and operating the shaft at 91 by the hand wheel 92. It will be understood that while the shaft 91 is herein shown as hand operated, this is merely illustrative of one form of the invention, the comparative sizes of the worm 90 and worm wheel 89 relative to those of the worm 76 and worm wheel 77 being such that a given rate of movement of the shaft 91 will move the platen considerably faster than a similar movement of the shaft 75. The hub 88 is fitted to turn on a bearing sleeve 93 similar to the sleeve 78, these sleeves being fitted to portions 94 of the fixed frame work, and serving to guide the feed screw 79 which passes therethrough, also serving as abutments against which the nut 83 may act from either side according to the direction that it is moving the platen.

The cutter box 68 is formed as a closed housing having an interior chamber into which the cutting hobs project and through which the pinion wire stock is passed for the cutting operation. This housing is equipped with a guide bushing 95 at one side thereof to receive the wire stock as it enters the box and a similar bushing 96 to guide the finished pinion wire out of the box, the bushing being suitably clamped in place by clamp bolts 97. The bushing 95 is suitably cut away adjacent the stock-entrance end thereof to permit turning cutters 98 to be adjusted therethrough against the stock from opposite sides, this adjustment being effected by screws 99 acting against the ends of said cutters, and the cutters being held in adjusted position by transverse set screws 100. The purpose of these cutters is to turn the stock down to exact size in case it should vary slightly, thereby keeping the pinion wire as it enters the bushing a uniform size throughout. This is important in order to maintain a smooth cut, since if the pinion wire stock should vary in size, particularly when small, it would allow the rod to move in the action of cutting the teeth, thereby producing a chattering cut. I provide means whereby oil is caused to circulate constantly through the cutter box, being retained therein and discharged at a definite outlet so that scattering and smearing of the oil over the machine and vicinity is avoided. For this purpose I provide an oil inlet from a piping 101 through a cover or cap 102 for the housing which may be clamped thereto by screws at 103. The oil is thus delivered directly upon the cutters and at the cutting point, and as it flows downward it is delivered from the bottom of the box through a discharge outlet 104, the oil being forced through this outlet as its only means of egress, and being also directly thereto by gravity. Bearings where the cutter shafts enter the box may be provided with felt washers or the like to prevent leakage in this direction.

It is sometimes desirable to operate the machine in more compact space than is possible where the platen or work table has a range of reciprocation corresponding to the extent of feed movement of the work, i. e., the pinion wire as described, this of course involving the running out of the table or platen for most of its length laterally of the machine at one limit of feed movement. In Figs. 11, 12 and 13 I show a form of the invention wherein instead of the table being thus required to feed out laterally from the machine, it is permanently fixed in position and a relatively short work holding and rotating head is mounted to slide thereon with a range of feed movement substantially across the length of the table. This stationary platen is here indicated at 105 equipped at its sides with undercut ways 106 throughout its length in which is fitted to slide a head 107 having upstanding supports 108 at the top of which is borne an elongated bearing sleeve 64' in which is fitted the chuck sleeve 63' having the chuck proper 67' at its inner end, and the worm gear 61' at its outer end. The worm gear 61' is driven by a worm 60' which is driven in like manner as in the first described form of the invention from bevel gearing 58' and spur gearing 57'. The gearing 57', 58', 60', 61' is all mounted on the sliding head 107 and in a bearing bracket 107' carried thereby, the driving member 109 of spur gear train 57' having a slidable key engagement with the shaft 110 which extends the length of the table and is suitably journaled thereunder, this shaft being driven by the spur gear train 56' from the shaft 54' which is connected with the driving train of the machine in like manner as the shaft 54 as before described. Thus it will be understood that the slidably key engagement of the gear 109 with the shaft 110 permits driving impulse for rotating the work in proper timed relation to the tool movement to be imparted to the work holding chuck throughout the range of feed movement thereof. In this form of the invention the feed screw 79' is mounted to rotate and is held from endwise movement in the fixed frame work underneath the stationary platen and engages a nut 111 fixed to and depending from the head 107, this nut extending through a passage 112 which extends the length of the platen. In this case a shaft extension 113 of the screw 79' has slidably keyed thereon the clutch sleeve 114 which is adapted to operatively engage either the clutch face 81' or the clutch face 87' which correspond to, and are driven in like manner as the clutch faces 81 and 87 of the first described form, these clutch faces being formed on gear hubs journaled on the shaft extension 113. Thus the head 107 may be reciprocated through a range of feed movement substantially as great as that of the platen in the first described form, without at any time overhanging from the side of the machine.

The main organization of my improved machine is also adapted for the rapid cutting or spur gears especially in the smaller sizes. For this purpose I may provide a work holding head or turret form adapted to be loaded with blanks at one point, while other blanks previously fitted thereto at another point are being cut, the turret being capable of being then turned so that the previously cut gears may be removed and new blanks applied, while the blanks just loaded on the turret at another point are swung to operative position. Such a turret is shown in Figs. 15 and 16 with a base or frame work 115 adapted to be bolted to the sliding platen or table 66. In this base is horizontally journaled a shaft 116 having at a projecting end a gear 117 which is adapted to be brought into mesh with the change gears 56 by a suitable adjustment of the change gear bracket or swinging arms 62 on which said gears are journaled. The inner end of the shaft 116 has bevel gear connection 118 with a short shaft 119 vertically journaled in the base 115 and having at its upper end bevel gear driving connection 120 with a shaft 121 horizontally journaled in a head 129 swiveled on the base 115 as will be presently more fully described. The shaft 121 has fixed at its opposite ends gears 122, 122' which mesh with gears 123, 123' loosely mounted on shafts 124, 124' which are journaled transversely in the head 129. The gears 123, 123' are adapted to be operatively engaged with their respective shafts by clutch collars 125, 125' slidably keyed on said shafts and engaging clutch faces formed on the sides of the respective gears. The shafts 124, 124' have fixed thereon worms 126, 126' respectively, the worm 126 meshing with a worm wheel 127 fixed on the work arbor 128 journaled in and extending out from the head 129 at one side thereof to receive gear blanks B to be cut. The other worm 126' in like manner meshes with a worm wheel 127' fixed on an arbor 128' extending out as shown oppositely and in offset relation to the arbor 128 and fitted to receive other blanks. It will be understood that the connections are so formed and arranged that the work arbors 128, 128' are driven in opposite directions so that they will turn the blanks thereon in the same direction when either arbor is moved into operative position. While this result may be effected in different ways, one convenient way of attaining the same is to have one of the worm wheels 126, or 126', and the coöperative worm wheel left handed. The head 129 is fitted to the base 115 with a swivel connection to turn about the shaft 119 as a center, the beveled gear 120 on shaft 121 turning about its coöperative gear on the shaft 119 in such adjustment, without disturbing the operative connection between said gears. As a means for clamping the head 129 in adjusted position on the base I provide a circular undercut slot 130 in the base in which are received heads of suitable clamping bolts 131 projecting down from the head 129.

Thus one of the arbors 128 or 128' may be loaded with blanks and the head 129 set with such blanks in operative position for cutting, the other arbor then projecting in convenient position for loading. Then when the cutting of the blanks on the first named arbor is finished, the head 129 may be reversed and the finished blanks removed, and those that have meanwhile been loaded on the other arbor turned to cutting position. For locating and locking the turret head 129 when adjusted to either of its operative positions, suitable means may be provided, such means being shown as a pin 132 slidably fitted in a hole 133 of the head 129 and adapted to fit into either of two opposite holes 134 in the base 115.

Thus the machine can be operated in a substantially continuous manner without requiring any stoppage for loading the blanks on the work arbors thereby effecting a considerable saving in time, it being understood that the swinging of the head 129 to either position and the clamping thereof may be quickly effected. It is to be observed that the present improved construction provides a machine wherein there is the widest possible range of adjustments for the roughing and finishing cutters as well as for the work so that the machine may be set according to the requirements of diverse kinds of work; further that this is effected by a mounting and arrangement of the driving and operating parts that is compact and rigid with simple, direct driving gear trains that transmit driving impulse with a freedom from chattering and vibration, and particularly with an elimination of universal joints and like expedients heretofore commonly in use. By having the finishing cutter carried directly on the prime drive shaft of the machine, and operated as shown directly by the belt drive, the greatest smoothness and evenness of cut is assured, while the finishing cutter with its bearing mounting may be adjusted to the requisite extent both angularly and in its several rectilinear adjustments without disarranging or rendering uneven its drive as would be the case for instance were a universal joint connection employed.

I consider my improved construction of housing or boxing for the working parts including the hobs and the work piece in its operating zone to be a valuable and important feature of the invention and especially valuable for pinion wire cutting, since it permits a circulation of oil through the immediate operating zone which is limited thereto; by reason of the fact that the inclosing housing provided is substantially oil tight, the lubricant circulation may be a forced one, projecting the lubricant rapidly past the cutting point, while keeping the adjacent parts of the machine clean and free from spattering of the lubricant. It is to be specially noted that in the present machine any spattering and scattering of oil is prevented, since the housing incloses the working parts not only from above as in the case of an ordinary guard, but also laterally and beneath, making it substantially a part of a continuous oil conduit. By thus making provision for a rapid forced flow of lubricant past the cutting point and keeping the working tools submerged in a swift current of lubricating medium, it will be understood that the present device may be well considered as in the nature of a cutter cooler since the lubricant current is sufficient not only for purposes of lubrication proper, but also to carry off all excess heat keeping the hobs perfectly cool. By merely providing a suitable series of bushing members such as the bushings 95, 96 with diverse sized passages therethrough to fit the particular stock being handled, it is possible to utilize the same housing for pinion rod or wire of a considerable range of sizes. I am aware that the invention may be embodied in other specific forms within the scope of the appended claims as to its various features and details of construction, and I therefore desire the present invention to be considered as illustrative and not restrictive, reference being made to the appended claims, rather than to the foregoing description, to indicate the scope of the invention.

Having described my invention, what I claim as new and desire to secure by Letters Patent is:

1. A machine of the kind described, comprising a prime drive shaft, a cutter fixed thereon, means for adjusting said shaft angularly, means for moving a work piece into operative relation with said cutter and transversely of said shaft, and a second cutter mounted to act on the work opposite the first named cutter and in geared connection with said shaft, the last named cutter having provision for angular adjustment whereby it may be set oppositely to the first named cutter.

2. A machine of the kind described, comprising a prime drive shaft, a cutter fixed thereon, means for adjusting said shaft angularly, means for moving a work piece into operative relation with said cutter and transversely of said shaft, a second cutter mounted to act on the work opposite the first named cutter and in geared connection with said shaft, the last named cutter having provision for angular adjustment whereby it may be set oppositely to the first named cutter, and means for relatively adjusting said cutters transversely of their axes and endwise of the direction of feed.

3. A machine of the kind described, comprising a prime drive shaft, a cutter fixed thereon, means for adjusting said shaft angularly, means for moving a work piece into operative relation with said cutter and transversely of said shaft, a second cutter mounted to act on the work opposite the first named cutter and in geared connection with said shaft, the last named cutter having provision for angular adjustment whereby it may be set oppositely to the first named cutter and means for relatively adjusting said cutters endwise of their axes and transversely of the direction of feed.

4. A machine of the kind described, comprising two hobs mounted in spaced apart generally parallel relation, means for driving said hobs, and means for feeding a work piece between said hobs, the mounting for said hobs having provision for adjusting them to different relative positions along the line of feed movement.

5. A machine of the kind described, comprising two hobs mounted in spaced apart generally parallel relation, means for driving said hobs, and means for feeding a work piece between said hobs, the mounting for said hobs having provision for adjusting them to different relative positions endwise of the axes thereof.

6. A machine of the kind described, comprising two hobs mounted in spaced apart generally parallel relation, means for driving said hobs, and means for feeding a work piece between said hobs, the mounting for said hobs having provision for adjusting them to different positions radially of the work.

7. A machine of the kind described, comprising two hobs mounted in spaced apart generally parallel relation, means for driving said hobs, and means for feeding a work piece between said hobs, the mounting for said hobs having provision for adjusting them to different angular positions with respect to each other.

8. A machine of the kind described, comprising a prime drive shaft, a cutting hob mounted thereon, feed operating means connected to be driven by said shaft for effecting a feed of a work piece into operative relation with said hob, and a mounting for said shaft having provision for endwise adjustment of said shaft and the hob carried thereby, said feed operating means being formed and arranged to preserve a continuous gear drive to the feed throughout the adjustments of said prime drive shaft.

9. A machine of the kind described, comprising a prime drive shaft, a cutting hob mounted thereon, feed operating means connected to be driven by said shaft for effecting a feed of a work piece into operative relation with said hob, and a mounting for said shaft having provision for transverse adjustment of said shaft and the hob carried thereby, said feed operating means being formed and arranged to preserve a continuous gear drive to the feed throughout the adjustments of said prime drive shaft.

10. A machine of the kind described, comprising a prime drive shaft, a cutting hob mounted thereon, feed operating means connected to be driven by said shaft for effecting a feed of a work piece into operative relation with said hob, and a mounting for said shaft having provision for angular adjustment of said shaft and the hob carried thereby, said feed operating means being formed and arranged to preserve a continuous gear drive to the feed throughout the adjustments of said prime drive shaft.

11. A machine of the kind described, comprising a cutting hob, means for operating the same, a hollow chuck adapted to receive pinion wire stock, a slide way extending transversely of the axis of said hob on which said chuck is fitted, and means for feeding said chuck along said slide way and for simultaneously rotating the same in timed relation to the rotation of said hob.

12. A machine of the kind described, comprising a cutting hob, means for operating the same, a work support having a slide way extending transversely of said hob underneath the same, an upright having a hollow chuck journaled therein fitted to slide on said way, means for feeding said upright along said way, and means for rotating the said chuck.

In testimony whereof I have signed my name to this specification, in the presence of two subscribing witnesses.

FRANK BURGESS.

Witnesses:
CLYDE L. ROGERS,
LOUISE A. JORDAN.